United States Patent [19]

Gillis et al.

[11] 4,268,255

[45] May 19, 1981

[54] AURAL REPRESENTATION OF EVENTS

[76] Inventors: Clifford J. Gillis, 121 Avon St., Malden, Mass. 02148; Alfred B. Ramage, 35 Charles St., Winthrop, Mass. 02152

[21] Appl. No.: 75,902

[22] Filed: Sep. 17, 1979

[51] Int. Cl.³ .............................................. G09B 19/22
[52] U.S. Cl. .................................................. 434/128
[58] Field of Search .............. 35/8 R, 8 A; 84/464 R, 84/464 A, 470 R, 470 P

[56] References Cited

U.S. PATENT DOCUMENTS 1,435,660 11/1922 Rogerson ........................ 35/8 A X
3,771,406 11/1973 Wheelwright ..................... 84/470 X
3,895,554 7/1975 Maillet .......................... 84/464 A X
3,955,289 5/1976 Gillis ........................................ 35/8 R

FOREIGN PATENT DOCUMENTS 2265426 10/1975 France ................................ 273/237

Primary Examiner—William H. Grieb

[57] ABSTRACT

An arrangement of audible sounds which is useful in instructing persons having poor vision, said sounds being representative of one or more events of a sequence of events which are generally perceived visually and are particularly useful when correlated to a sequence of moves encountered in the game of chess.

6 Claims, 2 Drawing Figures

AURAL REPRESENTATION OF EVENTS

BACKGROUND OF THE INVENTION

Methods for teaching have made significant advances in the recent past but until the instant invention there was no suitable method of teaching a blind person, or a person with very poor eyesight, the game of chess. Without sight the senses available to a person for perceiving the happening of an event generally perceived only through sight are hearing, feeling, smelling and tasting. Obviously hearing and feeling are the only two senses reasonably adaptable to employment for perception of movement of chess pieces. For purposes of teaching chess to the unsighted both the tactile and aural senses are valuable. The present invention, however, is concerned only with the correlation of sounds to the happening of a prior event or sequence of events. That is, it is the use of a non-verbal aural stimulus to reveal the occurrence of a particular past event or series of events which heretofore were cognizable only visually or tactilly.

In one particular aspect, this invention provides a means for teaching the game of chess to unsighted persons by correlating chess piece movements to aural stimuli, so that once the key relating sounds to events is learned, the unsighted person will know the move or moves made by the sounds perceived. In another aspect of this invention, the sounds representing a sequence of moves comprising an entire game of chess can be musically rendered for purposes of entertainment and may be used, for example, as an aural accompaniment to the visual depictions claimed in U.S. Pat. No. 3,955,289, issued on May 11, 1976, to Clifford J. Gillis.

The game of chess is internationally recognized and is a game in which each of two participants are permitted sixteen pieces including eight pawns, two rooks, two knights, two bishops, a queen and a king. Each piece may be moved in a uniquely restrictive fashion. The game is played on a board consisting of sixty-four squares and its objective is for one participant to capture the king of the other participant.

Generally the moves of a game of chess are defined in a notation form which gives the name of the piece moved and coordinates of the square to which it is moved. For example, P-K3 indicates that a pawn has been moved to the third rank in the file whose first rank was originally occupied by the king. This notation often accompanies a drawing of a chess board on which are depicted the chess pieces after a particular move or sequence of moves—though the precise sequence of moves which resulted in the pieces being in that position is not shown and can only be appreciated by reading the accompanying notation.

SUMMARY OF THE INVENTION

The present invention is directed toward an aural representation of a past event or events the occurrence of which, by itself, would not have been revealed by an aural accompaniment. In particular, a past sequence of events, which will preferably be associated with the moves of a game of chess, will be identified serially in a musical form which correlates to part of, or an entire game of chess. This not only provides a functional means for teaching the unsighted the game of chess, but results in an attractive musical rendition which correlates to the movement of chess pieces and may be appreciated while viewing a visual rendition which discloses the sequence of chess moves (as, for example, more fully described in aforementioned U.S. Pat. No. 3,955,289). It will be evident that the present invention is useful in teaching the unsighted to play games other than chess, such as, for example, checkers; and with a proper key to aural notation may be employed to aurally reveal an appropriate past sequence of events. For the sake of simplicity, however, the invention will be described with respect to the game of chess, the most preferred embodiment.

OBJECTS OF THE INVENTION

It is a primary object of the present invention to provide an aural representation of a past sequence of events.

It is another object of the present invention to provide an aural representation of one or more moves in the game of chess.

Another object of the present invention is to provide an aural means for teaching the unsighted the game of chess.

Still another object of the present invention is to provide a musical rendition which discloses some, or all of the moves comprising a game of chess.

The invention accordingly comprises the method and elements and sequence of elements which are exemplified by the following detailed disclosure, the scope of which will be indicated in the claims.

BRIEF DESCRIPTION OF THE DRAWINGS

For a fuller understanding of the nature and objects of the invention, reference should be had to the following detailed description taken in conjunction with the accompanying drawings wherein.

DETAILED DESCRIPTION OF THE INVENTION

The present invention essentially comprises a sequence of musical notes (though a single note might be used to depict some events, depending upon the grid key and notation philosophy employed) which reveal a past move or moves of one or more pieces in a game of chess. There are 32 pieces used, which comprise: eight white pawns, two white rooks, two white knights, two white bishops, a white queen, a white king, and a like array of black pieces. The musical notes associated with the moves made by these pieces depict the sequence of moves made and the interactions among the pieces.

For exemplary purposes, the moves made by each piece will be aurally defined by a musical note indicative of the space initially occupied by the piece, followed by notes representative of spaces traversed by the piece, and terminated by a note representative of the space on which the piece comes to rest. Since there are two routes that a knight might take to get to a particular space, both routes are musically depicted as will be described hereinbelow.

Each move of a piece is represented by a measure of music. The first measure represents white's opening move. Each measure thereafter represents a piece movement alternating between black and white until the game has been completed.

Figure 1:
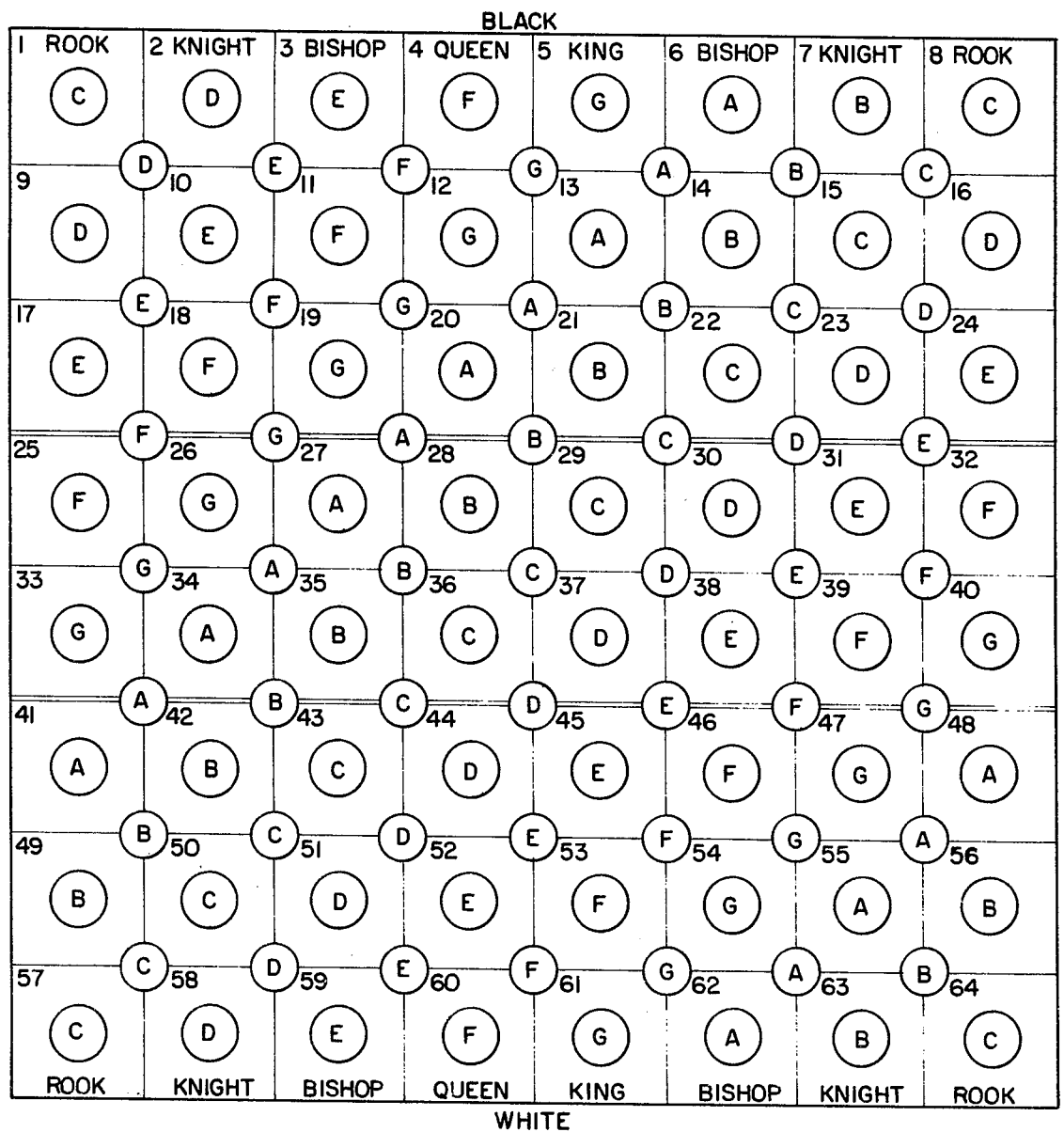
FIG. 1 is a grid representation of a chess board with individual squares identified by a note on the diatonic scale.

Referring to FIG. 1, a grid is depicted which correlates to the sixty-four spaces on a chess board. For convenience of explanation each space is numbered from 1 to 64. The white pieces reside on the lower portion of the drawing and the black on the upper. For further convenience of explanation, the names of the pieces originally residing in the first black and first white ranks are indicated. The second black and white ranks each contain eight pawns.

In the center of each of the sixty-four squares is a circle in which is denoted a note of the diatonic scale. The key selected is C major. Viewing a diagonal traversal from the black king's rook to the white queen's rook, all squares carry the denotation of the note C. The parallel diagonal rows going toward the white king's rook ascend from C in sequential order, i.e., D, E, F, etc. and the parallel diagonal rows going toward the black queen's rook descend from C, in sequential order, i.e., B, A, G, etc. The double lines which set off the middle two ranks represent octave changes. All the spaces in the center ranks (spaces 25 through 40), are represented by notes between middle C and the B next below high C, inclusive. All the spaces in the three ranks including the black pieces (spaces 1-24), are represented by notes between low C and the B next below middle C, inclusive; and all the spaces in the three ranks including the white pieces (spaces 41-64), are represented by notes between high C and the B next below higher C.

In addition, each intersection of four spaces is denoted by a musical note which is not necessary to practice the invention, but is employed to provide harmonic continuity. These notes are the same as the notes which denote the spaces in the diagonal rows in which they are located.

For purposes of convention, the intersection-denoting notes along the double lines separating the high octave from the middle octave are considered to be in the middle octave; and those along the double lines separating the low octave from the middle octave are considered to be in the low octave.

According to the described exemplary embodiment of the present invention, a move is described by the note representing the space from which the movement commences followed by the notes representing each space it passes through and ending with the new space of residence. For example, if white were to open by moving its king's pawn to king 4 (from space 53 to space 37), it would aurally be represented by a series of three notes, namely: high F, high E and middle D. If white's second move is king's bishop to knight 5 (space 62 to space 26), it would aurally be represented by nine notes, in series, namely: high A, high G, high F, high E, high D, middle C, middle B, middle A and middle G.

Since the knight is the only piece which can move from one space to another by two routes, both routes are denoted musically according to this exemplary convention. If, for example, white's king knight is moved to bishop 3 (from space 63 to space 46) one route would carry it through spaces 62 and 54 while the other route would carry it through spaces 55 and 47. Since spaces 62 and 55 are both represented by high A, and spaces 54 and 47 are both represented by high G, the exemplary convention would repeat the king movement aurally as a sequence of eight notes, namely high B, high B, high A, high A, high G, high G, high F, and high F. On the other hand, if white's queen knight is moved to bishop 3 (from space 58 to space 43) one route would carry it through spaces 59 and 51. Since spaces 50 and 59 are represented by different notes, and spaces 42 and 51 are represented by different notes, each route provides a different musical accompaniment. The first instance produces high D, high C, high B, high C; while the second produces high D, high E, high D, high C. This is denoted according to the described convention by the following sequence: high D, the chord comprising high C and high E, the chord comprising high B and high D, and high C.

Castling may be handled similarly to movement of a knight, for example, if black were to castle on the king side, the king movement would be represented by low G, low A, low B (from space 5 to space 7) while the rook movement would be represented by low C, low B, low A. This could be indicated in a measure by showing the notes serially or like the movement of a knight, to wit: the chord low G, low C, followed by the chord low A, low B played twice.

An enpassant capture may be shown, for example, by employing the note denotations for a diagonal pawn movement. If aural denotation of placing a king in check are to be used, this may be accomplished, for example, by playing a chord in an octave outside of the three playing octaves. Checkmate may be likewise shown if so desired.

In addition, if it is desired to musically describe one piece capturing another, it may be done, for example, by playing the piece move aural denominators simultaneously in the proper key grid octave and another octave.

Figure 2:
FIG. 2 is a sequential relationship of musical notes according to the grid key of FIG. 1, which describes musically a particular game of chess according to the present invention.

To further demonstrate the present invention a particular game, the Remusat—Napoleon game of 1802, is depicted musically in FIG. 2 according to the grid key of FIG. 1. The game, in standard chess notation, is as follows:

|  | Remusat | Napoleon |
| --- | --- | --- |
| 1. | P-K4 | N-KB3 |
| 2. | P-Q3 | N-QB3 |
| 3. | P-KB4 | P-K4 |
| 4. | BP × KP | QN × P |
| 5. | N-QB3 | NKB3-KN5 |
| 6. | P-Q4 | Q-KR5 |
| 7. | P-KN3 | Q-KB3 |
| 8. | KN-KR3 | N-KB6 (check) |
| 9. | K-K2 | N × PQ5 (check) |
| 10. | K-Q3 | N-K4 (check) |
| 11. | K × NQ4 | KB-QB4 (check) |
| 12. | K × B | Q-QN3 (check) |
| 13. | K-Q5 | Q-Q3 (Mate) |

Note, for example, whites first move, which is defined in the first measure of music, depicts pawn movement from space 53 to space 37, or musically high F, high E, middle D. Black's first move, in the second measure of music, depicts the movement of the knight from space 7 to space 22, or musically low B, followed by the chord low A low C, followed by the chord low B low D, followed by low C.

Black's second move, in measure 4, is an example of knight movement where both routes from space 2 to space 19 are identical musically according to the grid of FIG. 1.

The musical score denoted in FIG. 2 is accordingly an accurate aural depiction of a particular chess game. Once the listener has become familiarized with the grid key (FIG. 1), listening to the music of FIG. 2 will reveal the sequence of moves employed throughout the game.

It is to be understood that the establishment of the grid key is arbitrary and may be made in any key or sound arrangement according to the desires of the operator.

Since certain changes may be made in the above method and apparatus without departing from the scope of the invention herein described, it is intended that all matter contained in the above description or shown in the accompanying drawings shall be interpreted as illustrative and not in a limiting sense.

What is claimed is:

1. The method of providing an aural representation of a past sequence of movements of chess pieces which comprises:

forming a grid key having musical notes representing areas of the grid associated therewith, said grid being so constructed as to provide a visual perception of the said sequence of movements of chess pieces; and aurally representing said sequence of movements of chess pieces by the representative musical notes associated with said grid key which define the sequence of movements of said chess pieces.

2. The invention of claim 1 where in said grid comprises sixty-four spaces.

3. The invention of claim 2 wherein said sixty-four spaces are squares arranged in a square configuration with eight spaces on a side.

4. A sequence of musical notes which correlates to a past sequence of movements of chess pieces whereby the movement of said chess pieces and the sequence of movement of said chess pieces are defined by said musical notes, wherein the sequence of said musical notes is predicated upon a grid on which the movement of said chess pieces is visually defined, said grid comprising areas which are represented by musical notes associated therewith and upon which chess pieces and the sequence of movement of chess pieces are visually represented.

5. The invention of claim 4 wherein said key grid comprises sixty-four areas, each of which is represented by a musical note.

6. The invention of claim 5 wherein said sixty-four spaces are squares arranged in a square configuration with eight spaces on a side.

* * * * *